(12) United States Patent
Sunley et al.

(10) Patent No.: US 9,611,793 B2
(45) Date of Patent: Apr. 4, 2017

(54) METHOD FOR THERMAL CONTROL OF EXHAUST AFTERTREATMENT

(71) Applicant: Caterpillar Inc., Peoria, IL (US)

(72) Inventors: Ryan T. Sunley, Washington, IL (US); Sylvain Charbonnel, Peoria, IL (US); Spencer Huhn, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 130 days.

(21) Appl. No.: 14/451,025

(22) Filed: Aug. 4, 2014

(65) Prior Publication Data

US 2016/0032850 A1 Feb. 4, 2016

(51) Int. Cl.

| | |
|---|---|
| *F01N 3/00* | (2006.01) |
| *F02M 25/06* | (2016.01) |
| *F01N 3/10* | (2006.01) |
| *F02D 41/00* | (2006.01) |
| *F02D 41/02* | (2006.01) |
| *F02B 37/16* | (2006.01) |
| *F01N 3/20* | (2006.01) |
| *F01N 9/00* | (2006.01) |
| *F01N 11/00* | (2006.01) |
| *F02M 26/47* | (2016.01) |
| *F02M 26/00* | (2016.01) |
| *F01N 13/00* | (2010.01) |

(52) U.S. Cl.
CPC ....... *F02D 41/0055* (2013.01); *F01N 3/2066* (2013.01); *F01N 9/002* (2013.01); *F01N 11/002* (2013.01); *F02B 37/16* (2013.01); *F02D 41/027* (2013.01); *F02D 41/0245* (2013.01); *F02M 26/47* (2016.02); *F01N 13/009* (2014.06); *F01N 2610/02* (2013.01); *F01N 2900/0408* (2013.01); *F01N 2900/0412* (2013.01); *F01N 2900/1404* (2013.01); *F02D 41/0007* (2013.01); *F02D 41/029* (2013.01); *F02D 2200/0802* (2013.01); *F02M 2026/004* (2016.02); *Y02T 10/26* (2013.01); *Y02T 10/47* (2013.01)

(58) Field of Classification Search
CPC .. F01N 9/002; F02M 25/074; F02M 25/0748; F02M 25/0749; F02M 2025/0762
USPC ................... 60/278, 285, 295, 299
See application file for complete search history.

(56) References Cited

U.S. PATENT DOCUMENTS

| | | | |
|---|---|---|---|
| 4,719,751 A * | 1/1988 | Kume | F01N 3/0211 60/278 |
| 5,477,840 A | 12/1995 | Neumann | |
| 7,043,914 B2 * | 5/2006 | Ishikawa | F02M 25/0707 60/278 |
| 7,062,906 B2 | 6/2006 | Otake et al. | |
| 7,080,511 B1 | 7/2006 | Bolton et al. | |
| 7,178,326 B2 * | 2/2007 | Kojima | F02M 26/25 123/568.12 |
| 7,891,174 B2 | 2/2011 | Gioannini et al. | |

(Continued)

*Primary Examiner* — Thomas Denion
*Assistant Examiner* — Diem Tran
(74) *Attorney, Agent, or Firm* — Leydig, Voit & Mayer, LTD.

(57) ABSTRACT

There is disclosed a method of regenerating at least one aftertreatment device in an exhaust system of an internal combustion engine by changing a calibration of the exhaust gas recirculation system with the engine to increase temperature of exhaust gas provided to the at least one aftertreatment device, and further incrementally changing the calibration to obtain an exhaust gas temperature within a target regeneration temperature range.

16 Claims, 4 Drawing Sheets

(56) References Cited

U.S. PATENT DOCUMENTS

| | | |
|---|---|---|
| 8,631,642 B2 | 1/2014 | Carlill et al. |
| 8,931,263 B2 * | 1/2015 | Ikeda ............... F01N 3/035 |
| | | 60/285 |
| 2014/0000239 A1 | 1/2014 | Swoish et al. |
| 2014/0033685 A1 * | 2/2014 | Chandler ............ F01N 3/035 |
| | | 60/278 |

* cited by examiner

METHOD FOR THERMAL CONTROL OF EXHAUST AFTERTREATMENT

TECHNICAL FIELD

This patent disclosure relates generally to aftertreatment devices and, more particularly to methods of managing thermal properties of exhaust provided to aftertreatment devices.

BACKGROUND

Aftertreatment devices are commonly utilized in order to treat exhaust exiting engines in order to minimize noxious properties of gases exhausted from diesel engines, in particular. A number of technically distinct technologies are typically utilized in connection with the reduction of emissions of oxides of nitrogen (NOx) and particulate patter (PM, or soot) within exhaust.

One method of aftertreatment of exhaust gases, used especially in the road transport sector, is known as selective catalytic reduction (SCR). This uses a catalytic converter in which a water-DEF ("diesel exhaust fluid") solution is injected into the exhaust gases to reduce $NO_x$ emissions before expulsion into the atmosphere.

Yet another aftertreatment method is a lean $NO_x$ trap (LNT), which is a discontinuously operating aftertreatment technology. LNT has a number of operating modes including $NO_x$ storage during lean engine operation, $NO_x$ reduction during rich operation phases, and LNT desulfurization under rich conditions and high temperatures.

A method of $NO_x$ reduction is exhaust gas recirculation (EGR) in connection with exhaust gases prior to reaching the aftertreatment devices identified above. In this process, a portion of the exhaust gases is cooled and dosed back into the cylinders of the engine. Before reaching the atmosphere, the engine exhaust gases are cleansed of harmful partially or wholly unburned substances such as fuel or oil in the diesel oxidation catalyst (DOC), without the addition of a DEF solution, such as the SCR discussed above. A diesel particulate filter (DPF) is often utilized to intercept the particulate matter.

In order to maintain efficient operation of aftertreatment devices, the equipment should be cleaned at proper intervals generally based upon mileage, hours of operation, direct or indirect readings, or combinations of the same. Various methods exist for cleaning aftertreatment equipment, depending upon the piece of equipment. Equipment may be removed from a machine for cleaning, for example. Such removal of equipment for frequent cleaning, however, may be undesirable due to costly downtime, particularly when machines are used in the field. Some machines may include supplemental on-board equipment to facilitate cleaning or methods of regeneration. For example, sufficient heat may be provided to oxidize and capture soot accumulated on a diesel particulate filter. Levels of heat required in the regeneration processes of aftertreatment devices, as well as the intervals between such regeneration, may vary.

U.S. Pat. No. 7,808,511 to Bolton et al. controls the richness of the air/fuel mixture entering the engine, or engine air/fuel ratio, during a lean $NO_x$ trap (LNT) regeneration process by recirculating some air from the compressor discharge back to the compressor inlet. Bolton utilizes this same method to increase the engine exhaust temperature to promote regeneration of a diesel particulate filter, or increase catalyst light off. Controlling the exhaust temperature by way of this diversion of air from the compressor discharge back to the compressor inlet to control the richness of the fuel entering the engine, however, may result in an undesirable increase in $NO_x$ emissions.

SUMMARY

The disclosure describes, in one aspect, a method of regenerating at least one aftertreatment device in an exhaust system of an internal combustion engine including an exhaust gas recirculation system. The method includes determining if regeneration of the at least one aftertreatment device is needed. If regeneration is needed, the method changes a calibration of the exhaust gas recirculation system with the engine to increase a temperature of exhaust gas provided to the at least one aftertreatment device. The method then determines if the temperature of the exhaust gas provided to the aftertreatment device is above a regeneration target temperature. If the temperature of the exhaust gas provided to the aftertreatment device is above the regeneration target temperature, then the method determines if a target regeneration has occurred after a regeneration period. If the target regeneration has occurred, then regeneration is ended. Conversely, if the target regeneration has not occurred, then the method determines if the calibration of the exhaust gas recirculation system with the engine is at a maximum level; if the calibration of the exhaust gas recirculation system with the engine is not at the maximum level, then the method incrementally changes the exhaust gas recirculation system with the engine to increase the temperature of the exhaust gas provided to the at least one aftertreatment device until such time as the target regeneration occurred or the calibration of the exhaust gas recirculation system with the engine is at the maximum level. If, however, the temperature of the exhaust gas provided to the aftertreatment device is not above the regeneration target temperature, then the method determines if the calibration of the exhaust gas recirculation system with the engine is at the maximum level; if the calibration of the exhaust gas recirculation system with the engine is not at the maximum level, then the method incrementally changes the exhaust gas recirculation system with the engine to increase the temperature of the exhaust gas provided to the at least one aftertreatment device until such time as the temperature of the exhaust gas provided to the aftertreatment device is above the regeneration target temperature and target regeneration has occurred, or until the calibration of the exhaust gas recirculation system with the engine is at the maximum level.

The disclosure describes, in another aspect, a system for regenerating at least one aftertreatment device in an exhaust system of an internal combustion engine including an exhaust gas recirculation system. The system includes at least one sensor adapted to determine and provide a signal indicative of a temperature of exhaust gas reaching the at least one aftertreatment device, and at least one of at least one sensor associated with the at least one aftertreatment device and adapted to determine and provide a signal indicative of a level of regeneration of the aftertreatment device, and at least one timer adapted to provide a signal indicative of a time period for which the at least one aftertreatment device has received exhaust gas at a regeneration target temperature. The system further includes a controller including computer-readable instructions for calibrating the exhaust gas recirculation system with the engine, the instructions including: instructions for determining if regeneration of the at least one aftertreatment device is needed; instructions for changing a calibration of the exhaust gas recirculation system with the engine to increase a temperature of exhaust gas provided to the at least one aftertreatment device if regeneration is needed; instructions for determining if the temperature of the exhaust gas provided to the aftertreatment device is above the regeneration target temperature based upon the signal indicative of the temperature of exhaust gas reaching the at least one aftertreatment device; if the temperature of the exhaust gas provided to the aftertreatment device is above the regeneration target temperature, instructions for determining if a target regeneration has occurred after a regeneration period based upon the signal indicative of the level of regeneration of the aftertreatment device or the signal indicative of the time period; if the target regeneration has occurred, then instructions for ending regeneration; if the target regeneration has not occurred, then instructions for determining if the calibration of the exhaust gas recirculation system with the engine is at a maximum level; if the calibration of the exhaust gas recirculation system with the engine is not at the maximum level, then instructions for incrementally changing the exhaust gas recirculation system with the engine to increase the temperature of the exhaust gas provided to the at least one aftertreatment device until such time as the target regeneration occurred or the calibration of the exhaust gas recirculation system with the engine is at the maximum level; if the temperature of the exhaust gas provided to the aftertreatment device is not above the regeneration target temperature, then instructions for determining if the calibration of the exhaust gas recirculation system with the engine is at the maximum level; if the calibration of the exhaust gas recirculation system with the engine is not at the maximum level, then instructions for incrementally changing the exhaust gas recirculation system with the engine to increase the temperature of the exhaust gas provided to the at least one aftertreatment device until such time as the temperature of the exhaust gas provided to the aftertreatment device is above the regeneration target temperature and target regeneration has occurred, or until the calibration of the exhaust gas recirculation system with the engine is at the maximum level.

The disclosure describes, in yet another aspect, a transmission controller for calibrating the exhaust gas recirculation system with the engine to regenerate at least one aftertreatment device. The controller includes a computer-readable memory having thereon computer-executable instructions for exhaust gas recirculation system control. The instructions include instructions for determining if regeneration of the at least one aftertreatment device is needed; instructions for changing a calibration of the exhaust gas recirculation system with the engine to increase temperature of exhaust gas provided to the at least one aftertreatment device; instructions for determining if the temperature of the exhaust gas provided to the aftertreatment device is above a regeneration target temperature based upon the signal indicative of the temperature of exhaust gas reaching the at least one aftertreatment device; if the temperature of the exhaust gas provided to the aftertreatment device is above the regeneration target temperature, instructions for determining if a target regeneration has occurred after a regeneration period based upon the signal indicative of the level of regeneration of the aftertreatment device or the signal indicative of the time period; if the target regeneration has occurred, then instructions for ending regeneration; if the target regeneration has not occurred, then instructions for determining if the calibration of the exhaust gas recirculation system with the engine is at a maximum level; if the calibration of the exhaust gas recirculation system with the engine is not at the maximum level, then instructions for incrementally changing the exhaust gas recirculation system with the engine to increase the temperature of the exhaust gas provided to the at least one aftertreatment device until such time as the target regeneration occurred or the calibration of the exhaust gas recirculation system with the engine is at the maximum level; if the temperature of the exhaust gas provided to the aftertreatment device is not above the regeneration target temperature, then instructions for determining if the calibration of the exhaust gas recirculation system with the engine is at the maximum level; if the calibration of the exhaust gas recirculation system with the engine is not at the maximum level, then instructions for incrementally changing the exhaust gas recirculation system with the engine to increase the temperature of the exhaust gas provided to the at least one aftertreatment device until such time as the temperature of the exhaust gas provided to the aftertreatment device is above the regeneration target temperature and target regeneration has occurred, or until the calibration of the exhaust gas recirculation system with the engine is at the maximum level.

DETAILED DESCRIPTION

This disclosure relates to methods of controlling the temperatures of gases reaching aftertreatment devices in order to facilitate reductions of undesirable buildup of soot, particulate matter, sulfur or hydrocarbons within the aftertreatment devices. The methods disclosed herein have universal applicability in various types of machines. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, one or more implements may be connected to the machine. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, scarifiers, shears, snow plows, snow wings, and others.

Figure 1:
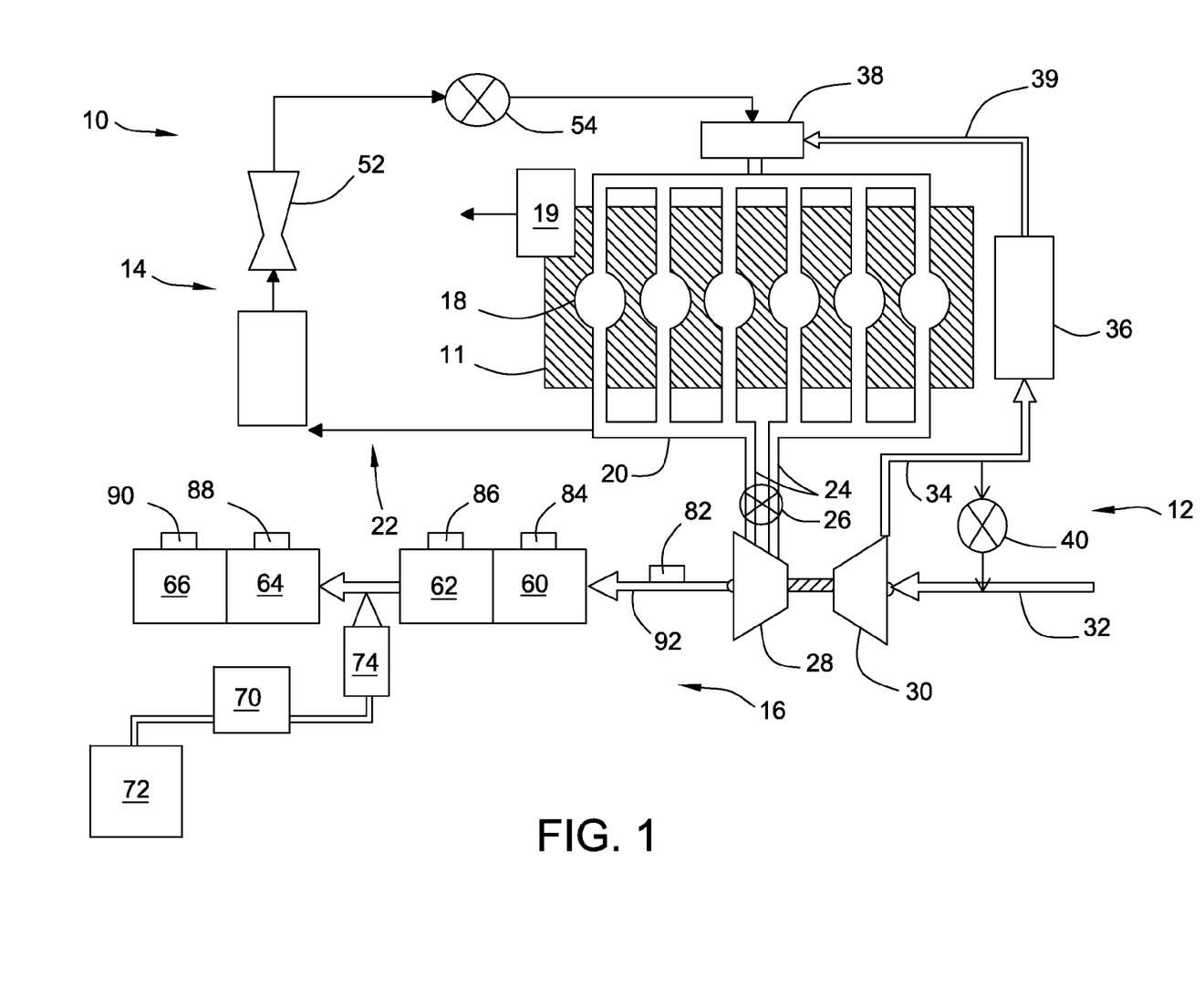
FIG. 1 is a fragmentary view of an exemplary exhaust treatment arrangement and engine.

Turning first to FIG. 1, there is illustrated an exemplary arrangement of an internal combustion engine (shown generally at 10) including, among other things, a crankcase 11. An inlet air supply system 12 provides combustion air to the engine 10, while an exhaust gas recirculation system 14 and aftertreatment devices (collectively identified as 16) of an exhaust system 17 may be used to reduce undesirable components of the generated exhaust gases. The crankcase 11 includes a plurality of cylinders 18, and may optionally be directly ventilated by way of open crankcase ventilation 19. In the illustrated arrangement, exhaust gases may exit the crankcase 11 through one or more plenums 20 downstream the cylinders 18 through a high pressure loop 22 to the exhaust gas recirculation system 14, or through one or more conduits 24 to a balance valve 26, and on to the aftertreatment devices 16.

The energy from gases exiting through the balance valve 26 may be utilized to rotate a turbine 28, which, in turn, provides energy to a compressor 30. The inlet air supply system 12 receives inlet air 32 at the compressor 30. The compressor 30 compresses inlet air 32; the compressed air then flows through conduit 34 to a cooler 36, here, an air-to-air after cooler. Air from the cooled air from the cooler 36 is provided to a mixer 38 upstream the cylinders 18 through conduit 39, for example. A boost recirculation valve 40 is provided to optionally divert some of the compressed air flow from the conduit 34 back to join with the inlet air 32 into the compressor 30. Diverting some of the compressed air flow back to the inlet of the compressor 30 ultimately provides one method of controlling the air/fuel ratio entering the cylinders 18. That is, the diversion of compressed air from the conduit 34 back to the compressor 30 reduces the airflow to the mixer 38, resulting in a richer air/fuel ratio to the cylinders 18.

The high pressure loop 22 to the exhaust gas recirculation system 14 diverts a portion of the exhaust gases from the cylinders 18 to an exhaust gas recirculation cooler (EGR cooler) 50, where the gases are cooled to a desired temperature. The gas is then directed to a venturi mass air flow sensor 52. The cooled gas is then directed to the mixer 38, the flow being controlled by an EGR valve 54. In the mixer 38, cooled gas from the exhaust gas recirculation system 14 is mixed with the cooled air from the compressor 30 before it is directed to the cylinders 18.

Regulated by valve 26, exhaust gases not redirected to the high pressure loop 22 proceed through conduits 24 to the turbine 28 from which they are directed to the aftertreatment devices 16 before being released. The aftertreatment devices 16 may include various types of devices. For example, in the illustrated embodiment, the exhaust gas first passes through a diesel particulate filter 60, which may be an appropriate filter known in the art or later developed. The diesel particulate filter 60 may be utilized to reduce both soot and particulate matter before passing the exhaust gases on to a catalyzed diesel particulate filter 62. The catalyzed diesel particulate filter 62 typically is coated with a diesel oxidation catalyst. While the catalyzed diesel particulate filter 62 further removes soot and particulate matter, the diesel oxidation catalyst may further induce chemical changes that may include oxidizing carbon monoxide, gas phase hydrocarbons, and the soluble organic fraction of diesel particulate matter to $CO_2$ and $H_2O$.

From the catalyzed diesel particulate filter 62, the exhaust gas is passed to selective catalytic reduction (SCR) device 64 and ammonia oxidation device 66. Before entering the selective catalytic reduction device 64, diesel exhaust fluid (DEF) is introduced. Here, a DEF pump 70 injects DEF, such as a water-urea solution, from a DEF tank 72 by way of a DEF nozzle 74 to reduce $NO_x$ and hydrocarbon (HC) emissions.

According to this disclosure, the engine 10 may be selectively calibrated to provide exhaust gases at the required temperatures for regeneration of the devices of the aftertreatment devices 16. More specifically, the exhaust gas recirculation system 14 may be utilized to calibrate the engine 10 to produce exhaust gases of a targeted temperature or temperature range in order to facilitate the regeneration of aftertreatment devices 16, including, for example the diesel particulate filter 60, the catalyzed diesel particulate filter 62, the selective catalytic reduction device 64, and the ammonia oxidation device 66. While in most modes of operation, the utilization of the exhaust gas recirculation system 14 will be adequate to provide the respective targeted temperature or temperature range for regeneration of a device, in regeneration activities requiring extremely high temperatures, the inlet air supply system 12 may be utilized to provide a richer air/fuel ratio in order to further increase the temperature of exhaust gases.

Figure 2:
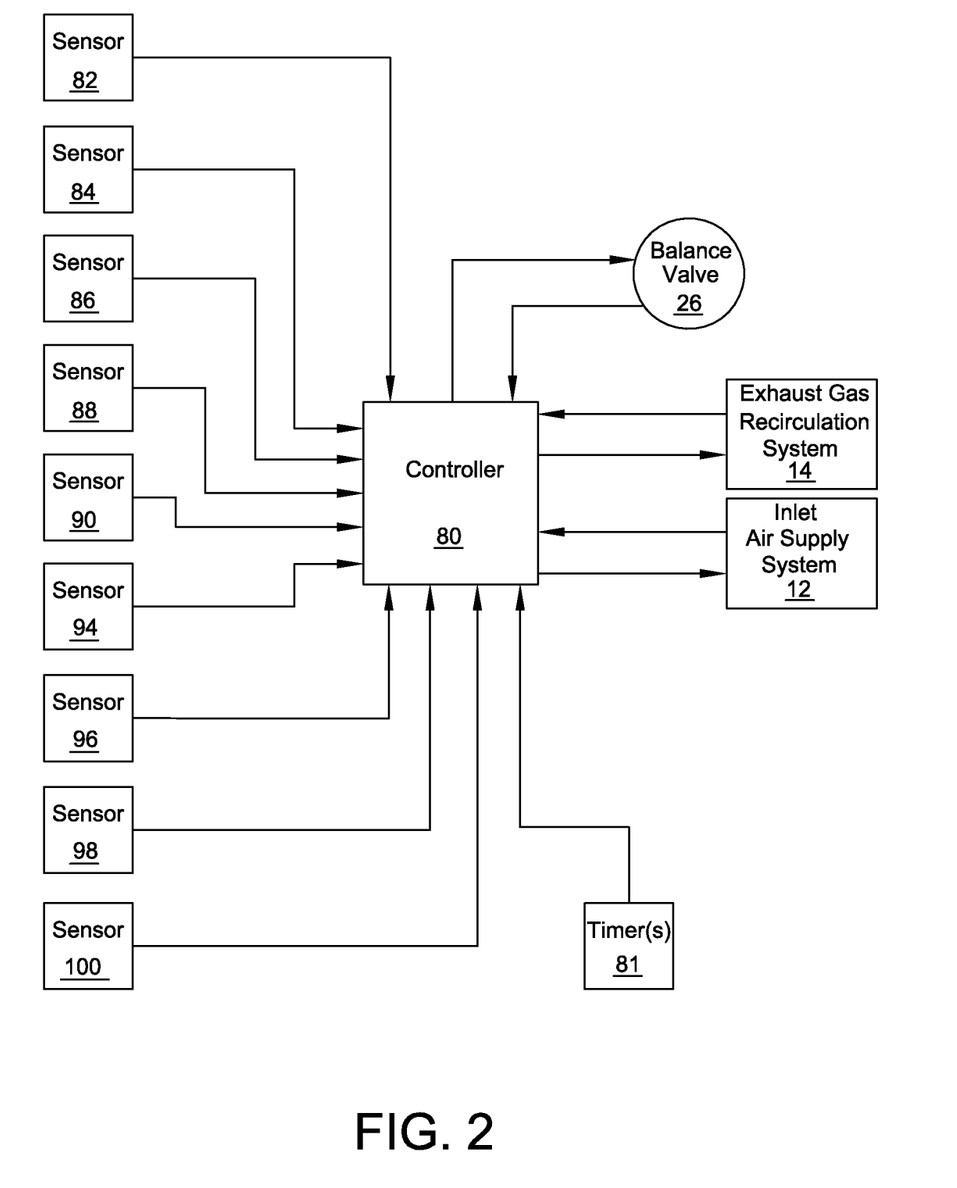
FIG. 2 is a schematic illustration of a method of regeneration of the exemplary exhaust treatment arrangement and engine of FIG. 1.

As illustrated in FIG. 2, a controller 80 receives signals representative of various modes of operation, readings of sensors, and time lapses and performs logic sequences in order to determine when regeneration is appropriate, to control regeneration, and to determine when regeneration is complete. One or more timers 81 and plurality of sensors 82, 84, 86, 88, 90, 94, 96, 98, 100 may be provided that provide signals to the controller 80 corresponding to respective readings. For example, one or more timers 81 may provide an indication of the passage of time since a last respective regeneration, or a length of time for which regeneration has occurred.

One or more sensors 82, 84, 86, 88, 90 may be provided to determine the temperature of exhaust gases entering or reaching the various aftertreatment devices 60, 62, 64, 66, and provide respective signals to the controller 80 indicative of the readings. In this regard, the sensors 82, 84, 86, 88, 90 may be provided at any appropriate location, such as, for example, in the gas flow path 92 from the turbine 28 or to the turbine 28, or in connection with one or more of the aftertreatment devices 60, 62, 64, 66. It will be appreciated that the one or more sensors may be disposed to provide a direct temperature reading or to provide temperature reading based upon which a temperature at an alternate position may be determined. For example, in an arrangement where the sensor 82 is disposed in the gas flow path 92 from the turbine 28, the temperature within the selective catalytic reduction device 64 may be determined based upon an appropriate calculation or assumptions made by those of skill in the art. One or more sensors 94, 96, 98, 100 may likewise be provided that are indicative of the operating conditions within the aftertreatment devices 60, 62, 64, 66, 74, including, for example, when regeneration is required, or the progress of regeneration within the aftertreatment device 60, 62, 64, 66, 74. By way of further example, one or more of the sensors 94, 96, 98, 100 may be $NO_x$, hydrocarbon, or soot sensors.

In those circumstances when regeneration is required or desired for a device, the controller 80 continues an appropriate logic sequence, providing signals to the exhaust gas recirculation system 14 and the inlet air supply system 12 as desired in order to reach an exhaust gas target temperature or temperature range. More specifically, the controller 80 may provide signals to control the boost recirculation valve 40 associated with the inlet air supply system 12, the EGR valve 54 associated with the exhaust gas recirculation system 14, or the balance valve 26 associated with flow from the engine 10 to the aftertreatment devices 16.

The controller 80 of this disclosure may be of any conventional design having hardware and software configured to perform the calculations and send and receive appropriate signals to perform the disclosed logic. The controller 80 may include one or more controller units, and may be configured solely to perform the disclosed strategy, or to perform the disclosed strategy and other processes of a machine. The controller 80 may be of any suitable construction, and may include a processor (not shown) and a memory component (not shown). In some embodiments the processor may be made up of multiple processors. The processor may be microprocessor(s) or other processor(s) as known in the art. For example, controller 80 may include a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

The processor may execute instructions for generating control and operation of the components, such as by the methods described herein. Such instructions may be read into or incorporated into a computer readable medium, such as the memory component or provided external to processor. In alternative embodiments, hard-wired circuitry may be used in place of or in combination with software instructions to implement a method. Thus, embodiments are not limited to any specific combination of hardware circuitry and software.

The term "computer-readable medium" as used herein refers to any medium or combination of media that participates in providing instructions to processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer or processor can read.

The memory component may include any form of computer-readable media as described above. The memory component may include multiple memory components.

INDUSTRIAL APPLICABILITY

The present disclosure is applicable to the regeneration of aftertreatment devices 16 in connection with the operation of an engine 10 including an exhaust gas recirculation system 14. Regeneration of aftertreatment devices 16 may be desirable at varied intervals, and may require different elevated exhaust gas temperatures for various durations.

For example, soot oxidation within the diesel particulate filter 60 may be required on the order of every forty hours of engine operation or idle in some embodiments. A desired target regeneration temperature range for soot oxidation may be between 300° C. and 450° C., and may proceed on the order of an hour in some embodiments.

Desulfation and deposit removal in connection with one or more of the selective catalytic reduction device 64, the ammonia oxidation device 66 or the DEF nozzle 74 may be required approximately every seventy hours of engine operation or idle in some embodiments. A desired target regeneration temperature range for desulfation and deposit removal may be between 420° C. and 520° C., and may proceed on the order of an hour in some embodiments.

In contrast, hydrocarbon evaporation and DEF injector decrystallization of the DEF nozzle 74 may be rarely required in some embodiments. A desired target regeneration temperature range for one or both of hydrocarbon evaporation and DEF injector decrystallization may be between 250° C. and 300° C., and may proceed on the order of a quarter of an hour in some embodiments.

Figure 3:
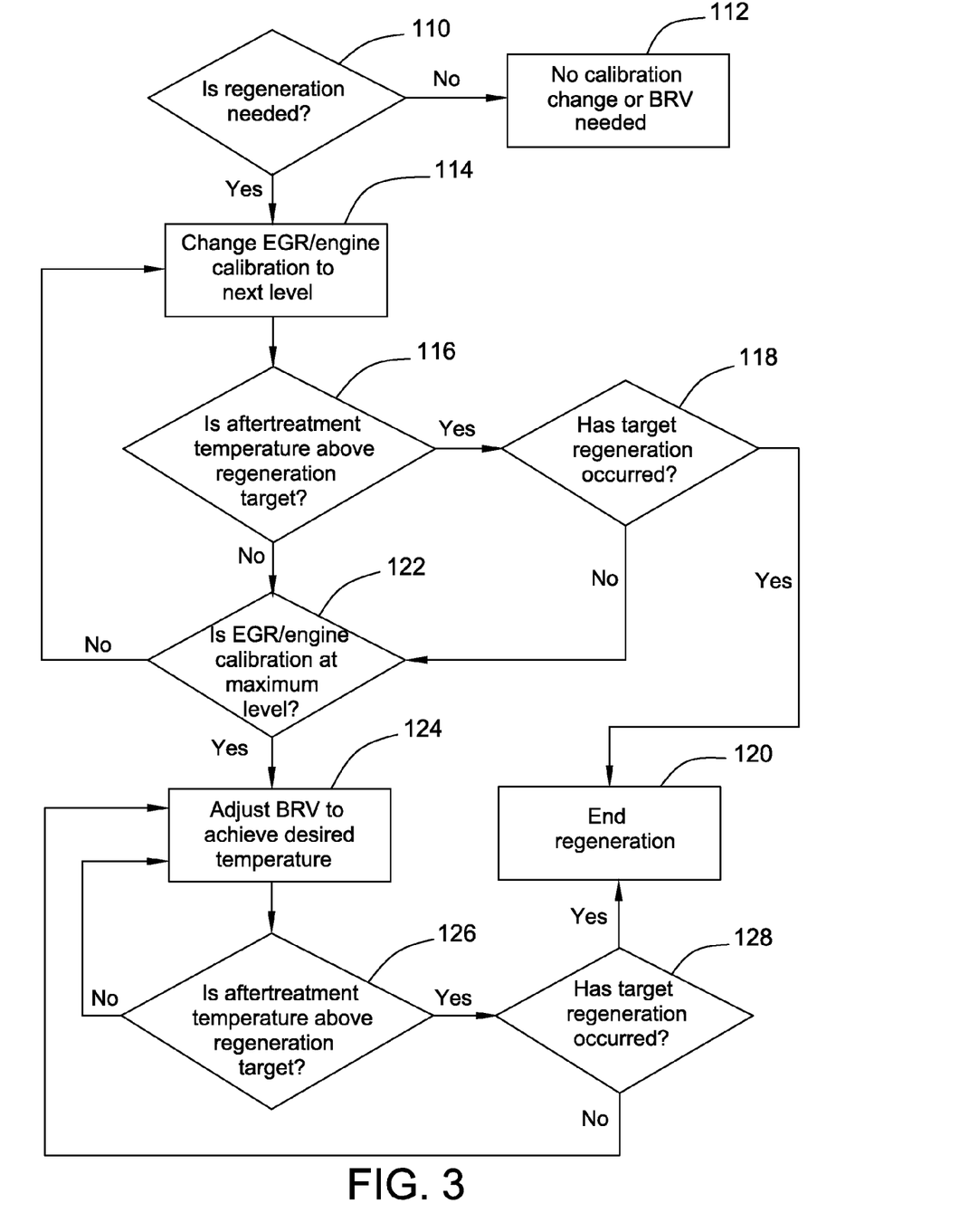
FIG. 3 is a flowchart illustrating a method of regeneration of aftertreatment devices.

Turning to FIG. 3, there is provided a method of regenerating at least one of the aftertreatment devices 16 in the exhaust system 17 of the internal combustion engine 10. The first method includes determining if regeneration of one or more of the aftertreatment devices 16 is needed (box 110). The determination of whether regeneration is needed may be a result of any appropriate method. By way of example only, the need for regeneration may be based upon a time lapse, as measure, for example, by the timer 81, or by a preset schedule. Alternatively or additionally, the need for regeneration may be based upon one or more of the signals from one or more of the sensors 94, 96, 98, 100. If no regeneration is needed, there is no change in the calibration of the exhaust gas recirculation system 14 to the engine 10, or inlet air supply system 12 by way of the boost recirculation valve 40 (box 112).

If regeneration is needed, however, the controller 80 causes a change in the calibration of the engine 10 by adjusting exhaust gas recirculation system 14 in order to increase the temperature of the exhaust gas to the aftertreatment devices 16 (box 114). In order to increase the temperature of the exhaust gas, typically, the volume of exhaust gases recirculated to the mixer 38 is decreased. This may be accomplished by any appropriate method, such as adjusting the EGR valve and/or the balance valve 26.

It is then determined in the temperature of the exhaust to the aftertreatment devices 16 is at or above a regeneration target temperature (box 116). For the purposes of this disclosure, the "regeneration target temperature" is a temperature at which regeneration is expected to occur for the respective aftertreatment device 60, 62, 64, 66, 74 for which regeneration is sought. The target temperatures for the aftertreatment devices 16 illustrated are as discussed above, for example. The temperature of the exhaust may be determined, for example, based upon a signal provided by one or more sensors 82, 84, 86, 88, 90 associated with the exhaust gases entering or within one or more of the aftertreatment devices 16.

If the aftertreatment temperature is at or above the regeneration target temperature, it is determined whether the target regeneration has occurred (box 118). The determination of whether the target regeneration has occurred may be based upon a signal provided by one or more of the sensors 94, 96, 98, 100 associated with the aftertreatment devices 16, for example. Alternatively, or additionally, the determination may be made based upon the length of time that the exhaust gases have been maintained at or above the target temperature.

If the target regeneration has occurred, then the regeneration is ended (box 120), for example, by changing calibration of the engine 10 by way of the calibration of the exhaust gas recirculation system 14 in order to again lower the temperature of the exhaust gases. If the target regeneration has not occurred (box 118), or if the temperature of exhaust gases to the aftertreatment devices 16 has not reached or is not above the regeneration target temperature (box 116), it is then determined whether the calibration of the engine 10 by way of the exhaust gas recirculation system 14 is at its maximum level (box 122). For the purposes of this disclosure, the maximum level of the calibration is considered to be a calibration level at which the exhaust gas recirculation system 14 and, optionally, fuel injection timing, is expected to provide the maximum exhaust gas temperature.

If the calibration of the engine 10 by way of the exhaust gas recirculation system 14 is not at its maximum level (box 122), then the calibration is changed by an increment to achieve the level of calibration expected to achieve an increase in temperature of the exhaust gases. That is, if the calibration of the exhaust gas recirculation system 14 and fuel injection timing may be adjusted to provide an increase in exhaust gas temperature, then the method goes back up to box 114, discussed above. The target regeneration temperature may be increased, particularly if the new target regeneration temperature would still fall within the target regeneration temperature range. This process may then continue until such time as the target regeneration has occurred, or the calibration of the engine 10 by way of the exhaust gas recirculation system 14 has reached its maximum level, i.e., changing the calibration is not expected to provide a further increase in the temperature of the exhaust gases.

It is expected that this method alone may provide the desired regeneration temperature in instances where, for example, the regeneration target temperature may be between 250° C. and 300° C., or where regeneration may be obtained without increasing the exhaust temperature to relatively high ranges, such as may be the case in regeneration requiring an exhaust temperature in excess of 500° C. Accordingly, this method alone may be appropriate for regeneration in connection with hydrocarbon evaporation and DEF injector decrystallization of the DEF nozzle 74.

If an increase in the exhaust temperature beyond that obtained by changing the calibration of the engine 10 by way of the exhaust gas recirculation system 14 is required, the temperature may be further increased by adjustments to the inlet air supply system 12. More specifically, the boost recirculation valve 40 may be adjusted to further increase the exhaust temperature.

Returning to FIG. 3, if the calibration of the engine 10 by way of the exhaust gas recirculation system 14 and, optionally, fuel injection timing, is at its maximum level (box 122), then the inlet air supply system 12 is adjusted to further increase the temperature of the exhaust gases. As indicated in box 124, the boost recirculation valve 40 may be adjusted to direct some of the compressed air from the outlet conduit 34 of the compressor 30 back to the inlet air 32 to the compressor 30. Accordingly, compressed air provided to the cooler 36 and on to the mixer 38 is reduced.

The method then determines if the temperature of the exhaust gases to the aftertreatment devices 16 is at or above the regeneration target temperature (box 126). If the aftertreatment temperature is at or above the regeneration target temperature, it is determined whether the target regeneration has occurred (box 128). As above, the determination of whether the target regeneration has occurred may be based upon a signal provided by one or more of the sensors 94, 96, 98, 100 associated with the aftertreatment devices 16, for example. Alternatively, or additionally, the determination may be made based upon the length of time that the exhaust gases have been maintained at or above the target temperature.

If the target regeneration has occurred, then the regeneration is ended (box 120), for example, by changing calibration of the boost recirculation valve 40 and the calibration of the exhaust gas recirculation system 14 in order to again lower the temperature of the exhaust gases. If the target regeneration has not occurred (box 128), however, or if the temperature of exhaust gases to the aftertreatment devices 16 has not reached or is not above the regeneration target temperature (box 126), then the boost recirculation valve 40 is again adjusted. More specifically, the boost recirculation valve 40 is adjusted to increase the volume of compressed air from the outlet conduit 34 of the compressor 30 recirculated to the inlet air 32 to the compressor 30, that is, back up to box 124, from which the steps are repeated until regeneration target temperature is achieved or exceeded (box 126), and the target regeneration has occurred (box 128).

It will be appreciated that any appropriate indicators may be utilized for determination of when a regeneration event should be undertaken. For example, although hydrocarbon evaporation may be rarely necessary, it may be desirable if the engine has been operating for prolonged periods at idle such that the aftertreatment temperature would be less than a threshold temperature, such as 150° C., or when injector crystallization is detected in the diesel exhaust fluid injector system. As a result, the engine calibration EGR/engine calibration may be changed to increase the temperature of the aftertreatment devices 16 to initiate regeneration. Load may be increased on the engine 10 by, for example, running a fan or other loads connected with the engine 10. If the aftertreatment temperature has reached the target temperature of 250° C., the temperature may be maintained for 15 to 20 minutes to provide the hydrocarbon evaporation and DEF injector crystallization. If the aftertreatment devices 16 have not reached the target temperature, then the boost recirculation valve 40 may be utilized to adjust the inlet air system 12 to provide a further increase in the temperature.

Similarly, if a low $NO_x$ conversion is detected or a desulfation timer triggers the initiation of desulfation, if too long of a period has passed, for example, based upon a desulfation shutdown counter, the engine may be shut down entirely. Conversely, if the engine conditions are such that desulfation and deposit removal is possible, the EGR/engine calibration may be modified to increase the aftertreatment temperature. Following recalibration, if a regeneration target temperature of 420° C.-450° C. has not yet been reached, and the maximum calibration level has not yet been reached, then the EGR/engine may be progressively calibrated to the next level until such time as the regeneration target temperature has been reached or the maximum calibration level has been reached. If the target temperature has not yet been reached when the EGR/engine is at a maximum calibration, then the boost recirculation valve 40 may be utilized to adjust the inlet air system 12 to provide a further increase in the temperature.

Figure 4:
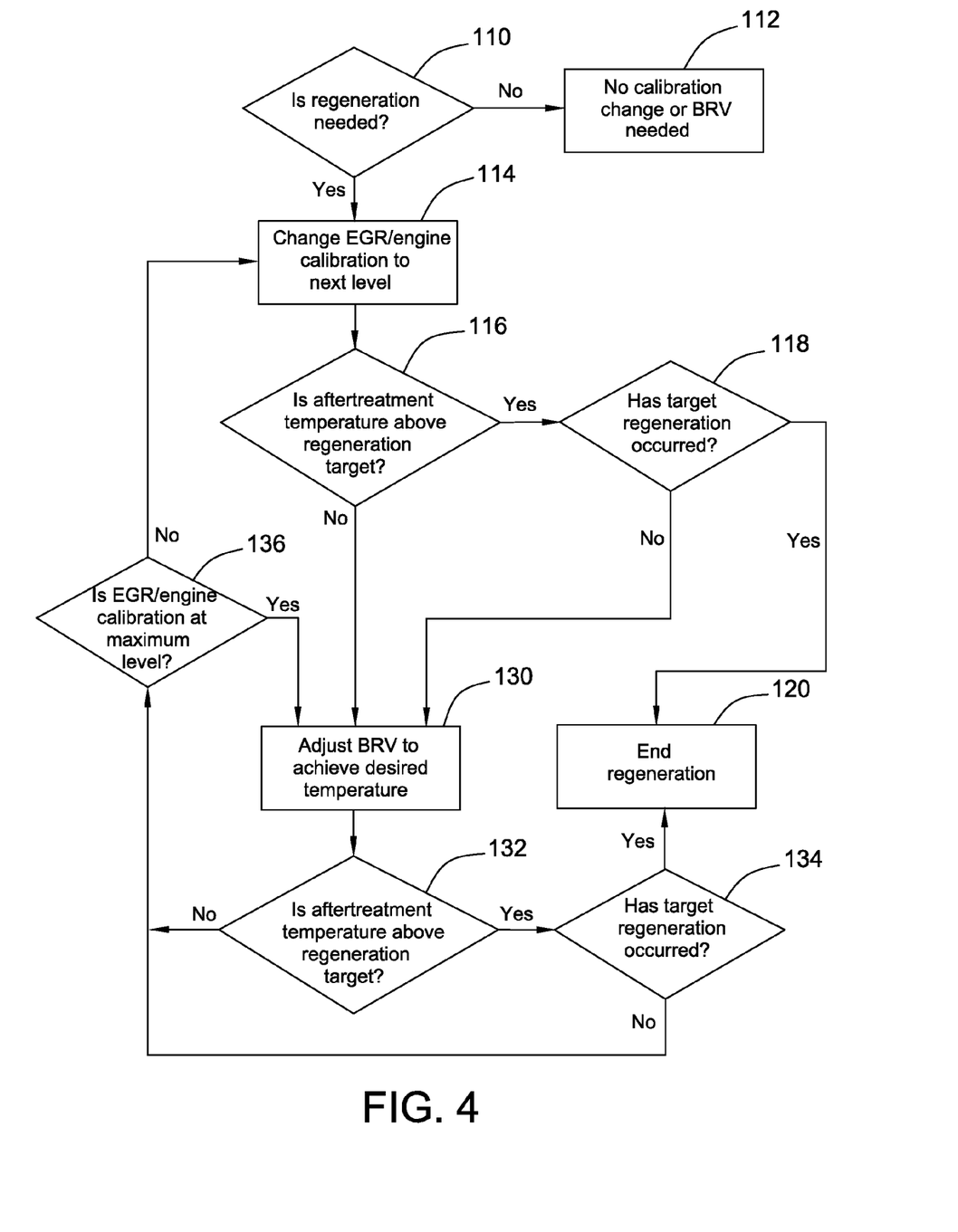
FIG. 4 is a flowchart illustrating an alternate embodiment of a method of regeneration of aftertreatment devices.

It will be appreciated that the increase in the calibration level of the EGR/engine does not necessarily require reaching it maximum before proceeding to the adjustment of the boost recirculation valve 40 to adjust the inlet air system 12. Referring to FIG. 4, it will be noted that boxes 110-120 are identical to those of FIG. 3. In this embodiment, however, the changes in the EGR/engine calibration are alternated with adjustments in the boost recirculation valve 40 to adjust the inlet air system 12.

In this way, if the change of the EGR/engine calibration does not provide the target aftertreatment temperature (box 116), then the boost recirculation valve 40 may be opened to adjust the inlet air system 12 to further increase the temperature of the aftertreatment devices 16 (box 130). It is then determined if the regeneration target temperature has been reached (box 132), and, if so, if the target regeneration has occurred (box 134), such that the regeneration may be ended (box 120). If the target temperature has not been reached (box 132), however, then it is determined if the EGR/engine calibration is at its maximum level (box 136). If it has not, then the EGR/engine calibration is changed to the next level (box 114), and the resultant temperature compared to the regeneration temperature target (box 116), and the method progresses as illustrated. If the maximum level has been reached (box 136), then the method returns to box 130, and the boost recirculation valve 40 is further opened to adjust the inlet air system 12, further increases in temperature to the aftertreatment equipment progressing by way of the boost recirculation valve 40 until target regeneration occurs (box 134). This method may be utilized, by way of example only, in connection with reaching a regeneration target temperature of 300° C. for soot regeneration. If target regeneration is not accomplished, then the target temperature could be progressively increased, for example, to 400° C.

In some embodiments, the disclosed methods may be utilized to provide efficient thermal management of aftertreatment devices and to maintain the health of aftertreatment devices.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of regenerating at least one aftertreatment device in an exhaust system of an internal combustion engine including an exhaust gas recirculation system, the method comprising:

determining if regeneration of the at least one aftertreatment device is needed;

changing a calibration of the exhaust gas recirculation system with the engine to increase temperature of exhaust gas provided to the at least one aftertreatment device;

determining if the temperature of the exhaust gas provided to the aftertreatment device is above a regeneration target temperature;

if the temperature of the exhaust gas provided to the aftertreatment device is above the regeneration target temperature, determining if a target regeneration has occurred after a regeneration period;

if the target regeneration has occurred, then ending regeneration;

if the target regeneration has not occurred, then determining if the calibration of the exhaust gas recirculation system with the engine is at a maximum level;

if the calibration of the exhaust gas recirculation system with the engine is not at the maximum level, then incrementally changing the calibration of the exhaust gas recirculation system with the engine to increase the temperature of the exhaust gas provided to the at least one aftertreatment device until such time as the target regeneration occurred or the calibration of the exhaust gas recirculation system with the engine is at the maximum level;

if the temperature of the exhaust gas provided to the aftertreatment device is not above the regeneration target temperature, then determining if the calibration of the exhaust gas recirculation system with the engine is at the maximum level;

if the calibration of the exhaust gas recirculation system with the engine is not at the maximum level, then incrementally changing the calibration of the exhaust gas recirculation system with the engine to increase the temperature of the exhaust gas provided to the at least one aftertreatment device until such time as the temperature of the exhaust gas provided to the aftertreatment device is above the regeneration target temperature and target regeneration has occurred, or until the calibration of the exhaust gas recirculation system with the engine is at the maximum level; and if the target regeneration of the at least one aftertreatment device has not occurred, then adjusting a boost recirculation valve associate with an inlet air supply system to divert some compressed air from downstream a compressor in the inlet air supply system to upstream the compressor prior to determining if the calibration exhaust gas recirculation system with the engine is at the maximum level.

2. The method of claim 1 further including if the calibration of the exhaust gas recirculation system with the engine is at the maximum level, then adjusting the boost recirculation valve associated with the inlet air supply system to divert some compressed air from downstream the compressor in the inlet air supply system to upstream the compressor.

3. The method of claim 2 wherein the at least one aftertreatment device is a selective catalytic reduction device.

4. The method of claim 1 further including if the target regeneration has not occurred, then increasing the target regeneration temperature.

5. The method of claim 1 further including if the target regeneration has not occurred, then determining if an increase in the target regeneration temperature would be within a target regeneration temperature range, and, if so, then determining if the calibration of the exhaust gas recirculation system with the engine is at its maximum level.

6. The method of claim 1 further including, if the target regeneration of the at least one aftertreatment device has not occurred following adjustment of the boost recirculation valve associated with the inlet air supply system, then determining if the calibration of the exhaust gas recirculation system with the engine is at the maximum level.

7. The method of claim 1 wherein the at least one aftertreatment device is a selective catalytic reduction device.

8. A system for regenerating at least one aftertreatment device in an exhaust system of an internal combustion engine including an exhaust gas recirculation system, the system comprising:
- at least one sensor adapted to determine and provide a signal indicative of a temperature of exhaust gas reaching the at least one aftertreatment device;
- at least one of
  - at least one sensor associated with the at least one aftertreatment device and adapted to determine and provide a signal indicative of a level of regeneration of the aftertreatment device, and
  - at least one timer adapted to provide a signal indicative of a time period for which the at least one aftertreatment device has received exhaust gas at a regeneration target temperature;
- an inlet air supply system including a compressor;
- a boost recirculation valve associated with the inlet air supply system; and
- a controller including computer-readable instructions for calibrating the exhaust gas recirculation system with the engine, the instructions including:
- instructions for determining if regeneration of the at least one aftertreatment device is needed;
- instructions for changing a calibration of the exhaust gas recirculation system with the engine to increase temperature of exhaust gas provided to the at least one aftertreatment device;
- instructions for determining if the temperature of the exhaust gas provided to the aftertreatment device is above a regeneration target temperature based upon the signal indicative of the temperature of exhaust gas reaching the at least one aftertreatment device;
- if the temperature of the exhaust gas provided to the aftertreatment device is above the regeneration target temperature, instructions for determining if a target regeneration has occurred after a regeneration period based upon the signal indicative of the level of regeneration of the aftertreatment device or the signal indicative of the time period;
- if the target regeneration has occurred, then instructions for ending regeneration;
- if the target regeneration has not occurred, then instructions for determining if the calibration of the exhaust gas recirculation system with the engine is at a maximum level;
- if the calibration of the exhaust gas recirculation system with the engine is not at the maximum level, then instructions for incrementally changing the calibration of the exhaust gas recirculation system with the engine to increase the temperature of the exhaust gas provided to the at least one aftertreatment device until such time as the target regeneration occurred or the calibration of the exhaust gas recirculation system with the engine is at the maximum level;
- if the temperature of the exhaust gas provided to the aftertreatment device is not above the regeneration target temperature, then instructions for determining if the calibration of the exhaust gas recirculation system with the engine is at the maximum level;
- if the calibration of the exhaust gas recirculation system with the engine is not at the maximum level, then instructions for incrementally changing the calibration of the exhaust gas recirculation system with the engine to increase the temperature of the exhaust gas provided to the at least one aftertreatment device until such time as the temperature of the exhaust gas provided to the aftertreatment device is above the regeneration target temperature and target regeneration has occurred, or until the calibration of the exhaust gas recirculation system with the engine is at the maximum level; and
- wherein the instructions further include instructions for adjusting the boost recirculation valve associated with the inlet air supply system to divert some compressed air from downstream the compressor in the inlet air supply system to upstream the compressor occur if the calibration of the exhaust gas recirculation system with the engine is at the maximum level.

9. The system of claim 8 wherein the instructions further include instructions for increasing the target regeneration temperature if the target regeneration has not occurred.

10. The system of claim 8 wherein the instructions further include instructions for determining if an increase in the target regeneration temperature would be within a target regeneration temperature range if the target regeneration has not occurred, and, if so, then determining if the calibration of the exhaust gas recirculation system with the engine is at its maximum level.

11. The system of claim 8 wherein the instructions further include instructions for adjusting the boost recirculation valve associated with the inlet air supply system to divert some compressed air from downstream the compressor in the inlet air supply system to upstream the compressor occur prior to determining if the calibration of the exhaust gas recirculation system with the engine is at the maximum level if the target regeneration of the at least one aftertreatment device has not occurred.

12. The system of claim 8 wherein the at least one aftertreatment device is a selective catalytic reduction device.

13. A transmission controller for calibrating the exhaust gas recirculation system with the engine to regenerate at least one aftertreatment device, the controller including a computer-readable memory having thereon computer-executable instructions for exhaust gas recirculation system control, the instructions comprising:
- instructions for determining if regeneration of the at least one aftertreatment device is needed;
- instructions for changing a calibration of the exhaust gas recirculation system with the engine to increase a temperature of exhaust gas provided to the at least one aftertreatment device if a regeneration is needed;
- instructions for determining if the temperature of the exhaust gas provided to the aftertreatment device is above a regeneration target temperature based upon the signal indicative of the temperature of exhaust gas reaching the at least one aftertreatment device;
- if the temperature of the exhaust gas provided to the aftertreatment device is above the regeneration target temperature, instructions for determining if a target regeneration has occurred after a regeneration period based upon the signal indicative of the level of regeneration of the aftertreatment device or the signal indicative of the time period;

if the target regeneration has occurred, then instructions for ending regeneration;

if the target regeneration has not occurred, then instructions for determining if the calibration of the exhaust gas recirculation system with the engine is at a maximum level;

if the calibration of the exhaust gas recirculation system with the engine is not at the maximum level, then instructions for incrementally changing the calibration of the exhaust gas recirculation system with the engine to increase the temperature of the exhaust gas provided to the at least one aftertreatment device until such time as the target regeneration occurred or the calibration of the exhaust gas recirculation system with the engine is at the maximum level;

if the temperature of the exhaust gas provided to the aftertreatment device is not above the regeneration target temperature, then instructions for determining if the calibration of the exhaust gas recirculation system with the engine is at the maximum level;

if the calibration of the exhaust gas recirculation system with the engine is not at the maximum level, then instructions for incrementally changing the calibration of the exhaust gas recirculation system with the engine to increase the temperature of the exhaust gas provided to the at least one aftertreatment device until such time as the temperature of the exhaust gas provided to the aftertreatment device is above the regeneration target temperature and target regeneration has occurred, or until the calibration of the exhaust gas recirculation system with the engine is at the maximum level;

wherein the instructions further include instructions for adjusting a boost recirculation valve associated with an inlet air supply system to divert some compressed air from downstream a compressor in the inlet air supply system to upstream the compressor occur if the calibration of the exhaust gas recirculation system with the engine is at the maximum level.

14. The transmission controller of claim 13 wherein the instructions further include instructions for determining if an increase in the target regeneration temperature would be within a target regeneration temperature range if the target regeneration has not occurred, and, if so, then determining if the calibration of the exhaust gas recirculation system with the engine is at its maximum level.

15. The transmission controller of claim 13 wherein the instructions further include instructions for adjusting the boost recirculation valve associated with the inlet air supply system to divert some compressed air from downstream the compressor in the inlet air supply system to upstream the compressor occur prior to determining if the calibration of the exhaust gas recirculation system with the engine is at the maximum level if the target regeneration of the at least one aftertreatment device has not occurred.

16. The transmission controller of claim 13 wherein the at least one aftertreatment device is a selective catalytic reduction device.

* * * * *